C. G. ASHLEY & E. T. BYSHE.
PERFORATING DEVICE.
APPLICATION FILED FEB. 5, 1916.

1,278,089.

Patented Sept. 10, 1918.
6 SHEETS—SHEET 1.

Witnesses:
Leslie S. Baines
Eustace L. B. Hamlin

Inventors,
Charles G. Ashley
Ernest T. Byshe
Per, Wm. J. Herdman
Att'y.

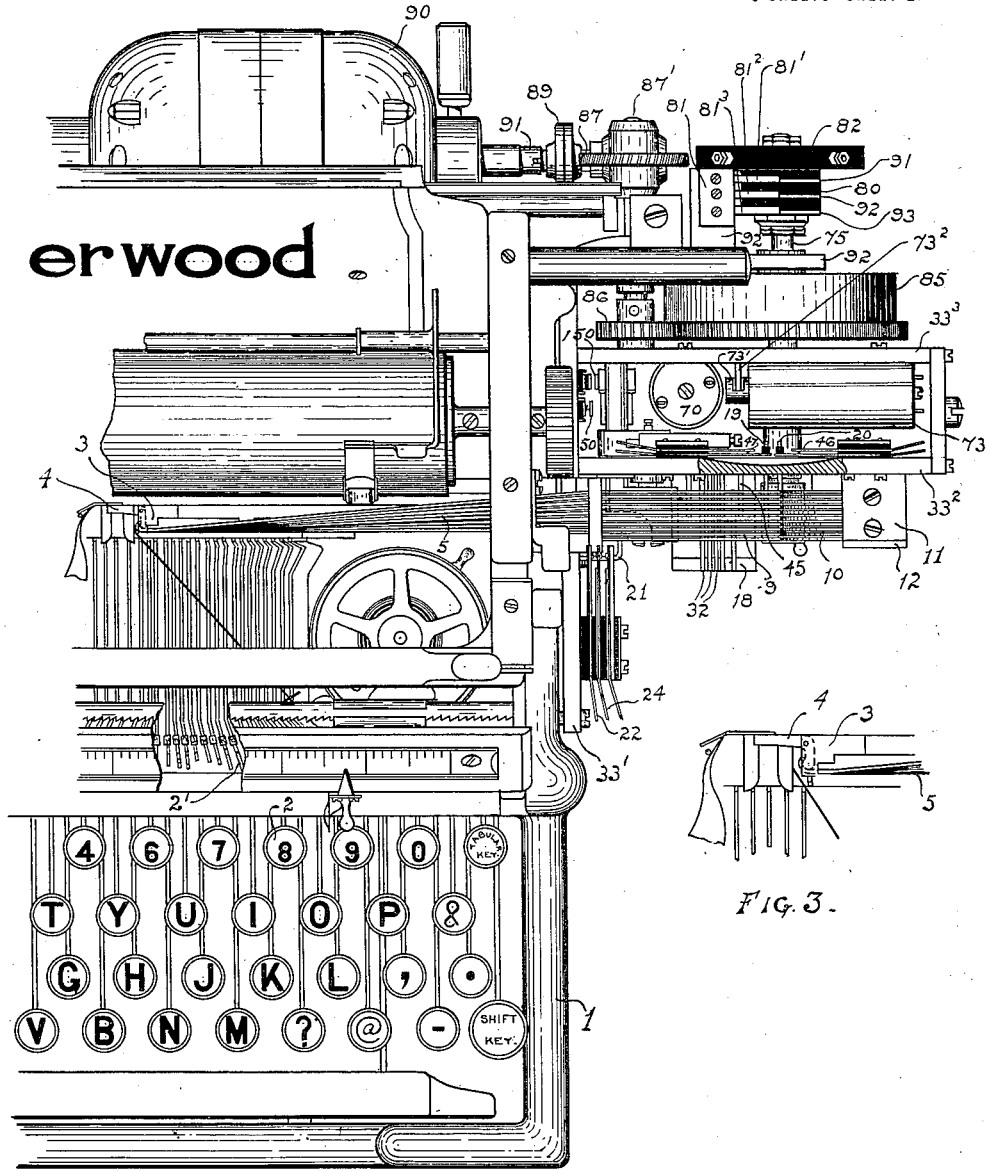

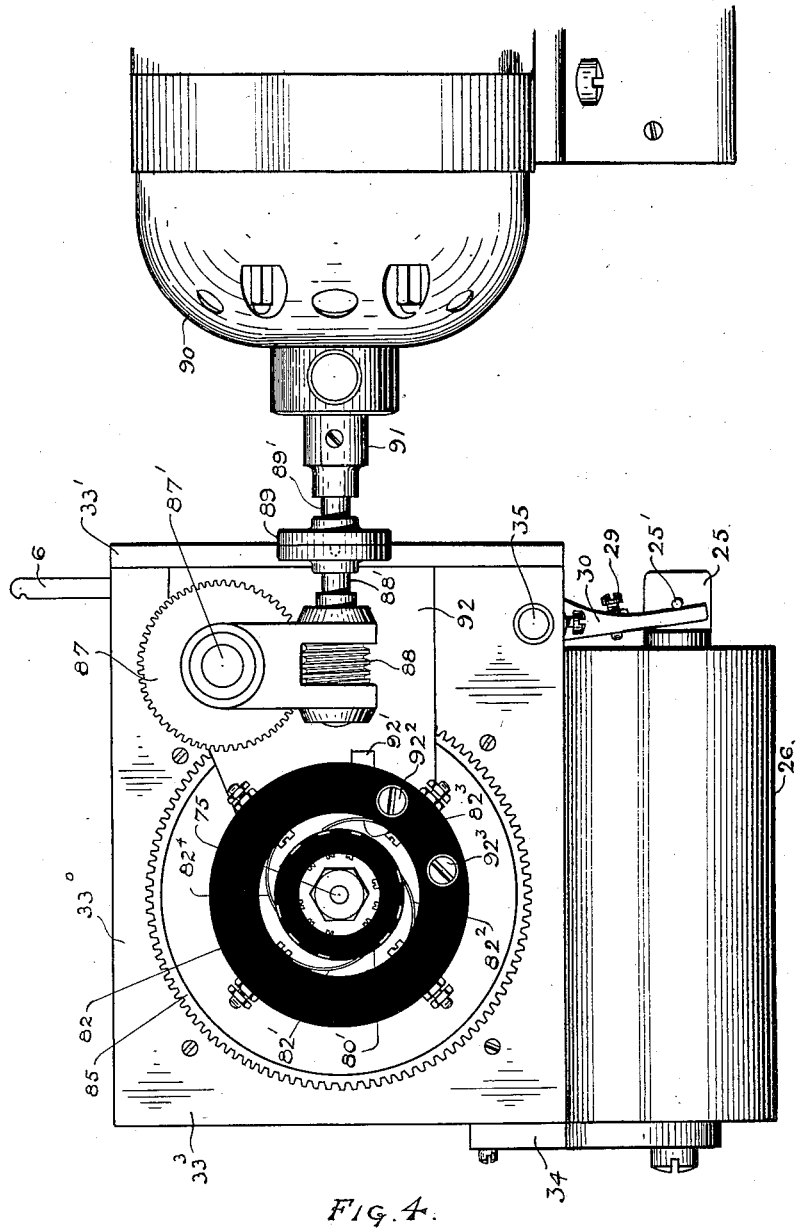

C. G. ASHLEY & E. T. BYSHE.
PERFORATING DEVICE.
APPLICATION FILED FEB. 5, 1916.

1,278,089.

Patented Sept. 10, 1918.
6 SHEETS—SHEET 4.

Witnesses:—
Leslie S. Baines,
Eustace L. B. Hamlin.

Inventors,
Charles G. Ashley
Ernest T. Byshe
By Wm. J. Herdman.
Atty.

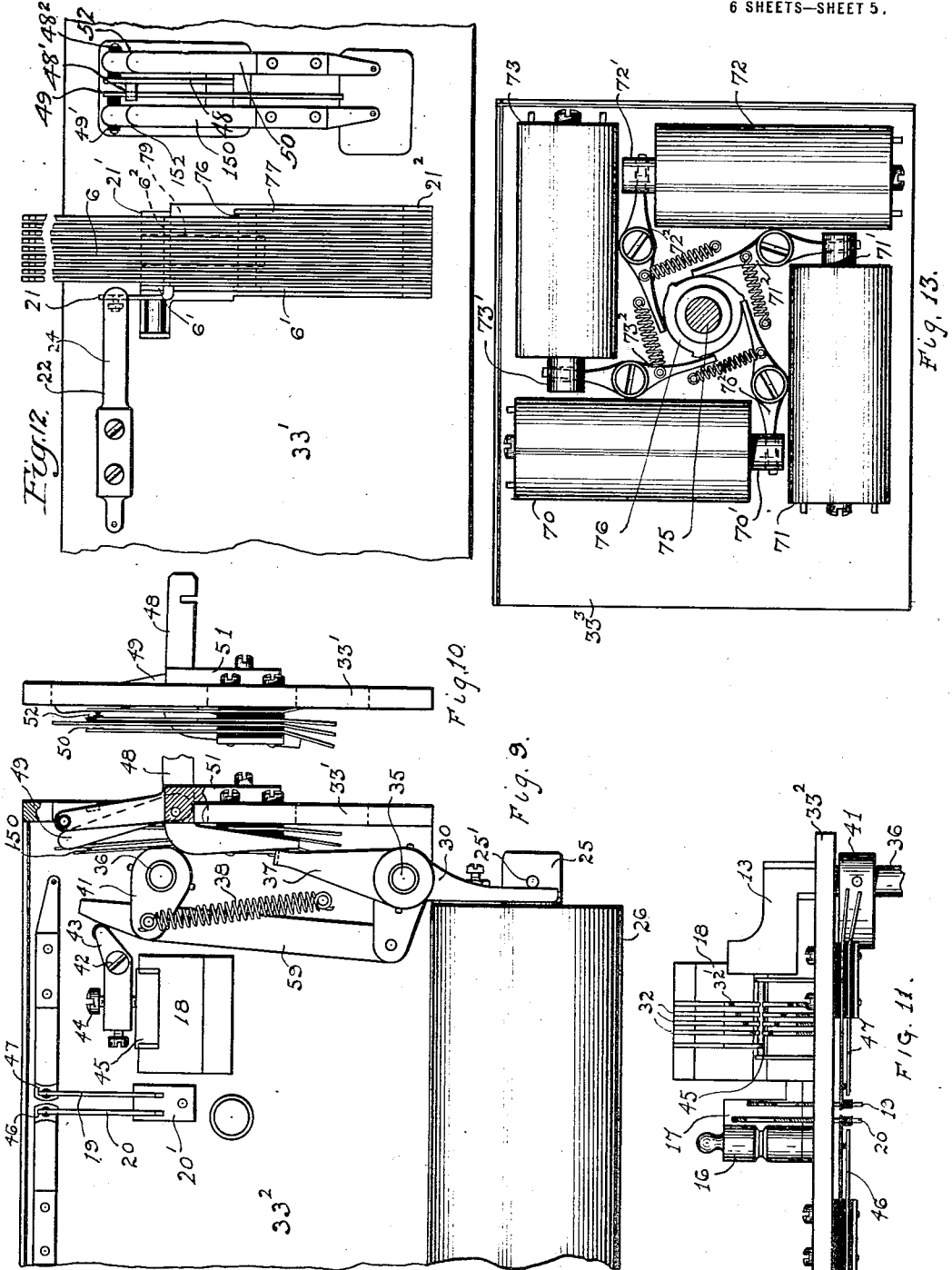

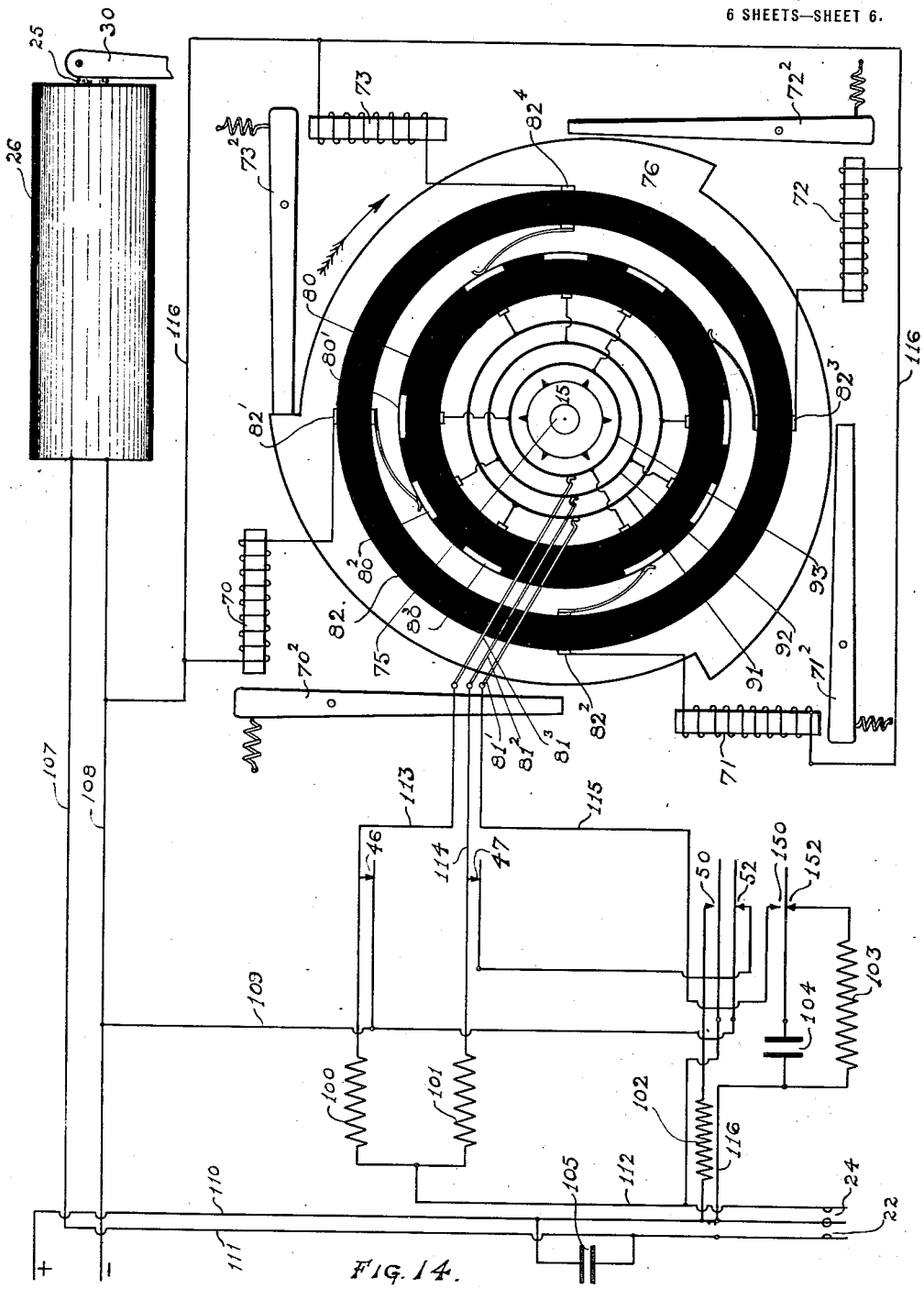

UNITED STATES PATENT OFFICE.

CHARLES G. ASHLEY AND ERNEST T. BYSHE, OF TORONTO, ONTARIO, CANADA, ASSIGNORS TO GENERAL ENGINEERING AND CONSTRUCTION COMPANY, LIMITED, OF TORONTO, ONTARIO, CANADA, A CORPORATION OF ONTARIO.

PERFORATING DEVICE.

1,278,089.      Specification of Letters Patent.      Patented Sept. 10, 1918.

Application filed February 5, 1916. Serial No. 76,298.

*To all whom it may concern:*

Be it known that we, CHARLES G. ASHLEY, a citizen of the United States of America, and a resident of Toronto, county of York, and Province of Ontario, Canada, and ERNEST T. BYSHE, a citizen of the Dominion of Canada, and resident of Toronto, county of York, and Province of Ontario, have invented a new and useful Improvement in Perforating Devices, of which the following is a specification.

Our invention relates to perforating machines and pertains specifically to that class of such mechanisms which are used in the preparation of transmitting tapes for automatic telegraph systems and the like.

The principal objects of our invention comprise producing a perforator in which the time interval consumed by each of the operations necessary for the full performance of its function is excedingly small. In which some of the operations are substantially simultaneously performed to condense the sequence of all the operations into a time interval which is less than the time interval between successive operations of any two keys of an ordinary typewriter, when the same is operated by a competent operator, that such typewriter keyboard may be used as a means for releasing the mechanism of our perforator. We further through our novel mechanism provide a keyboard perforator in which the weight of touch is in no way altered from that of the ordinary typewriter, in order that the high speed of a competent operator will not be lessened when such an operator is operating our device.

We realize these and other very desirable features, which will hereinafter be pointed out and fully described, by a novel electro-mechanical means which employs, briefly, directly applied energy to select the combination of punches to be used at any one time, the spacing required for that particular group of perforations, and to release mechanically stored energy to perform the act of perforating. This released mechanical energy in turn determines the spacing in accordance with the previous selection just made, makes an electrical contact which supplies electrical energy to retrieve the punches used and again place them in a position of potential operation, and this motive force in turn makes an electrical contact which supplies electrical energy to release mechanically stored energy to perform the act of moving the perforated tape in accordance with the spacing previously selected and determined. The mechanically stored energy used in the act of moving the tape is automatically replenished when it reaches a predetermined minimum by electro-magnetic energy.

In rapid printing telegraph systems it is sometimes necessary in order to transmit a single character to provide in a strip of transmitting tape a group of perforations extending in rows both longitudinally and transversely of the tape, and we have illustrated our improved apparatus as adapted to make the most complicated grouping of perforations, but our perforator may be adapted to simpler systems of perforated groups, without altering the principle we employ, by merely varying in part or whole the proper details of the mechanism.

In the drawings which accompany and form a part of this specification, in which like numerals designate corresponding parts throughout and functional mechanisms consisting of many parts are designated by one numeral when referred to as a whole:

Fig. 2 is a plan view showing a portion of the operating typewriter.

Fig. 3 is a plan view of the punch selecting bell-cranks on an enlarged scale.

Fig. 4 is a rear elevation on an enlarged scale with the operating typewriter omitted.

Fig. 9 is an elevation partially in section and on an enlarged scale of the restoring, releasing and spacing mechanism.

Fig. 10 is a non-sectional elevation of the contacts and operating mechanism of Fig. 9.

Fig. 11 is a plan view on an enlarged scale of the die, punch bars and spacing bell cranks.

Fig. 12 is an elevation on an enlarged scale of the latching bars, and the contacts shown in Fig. 10.

Fig. 13 is an elevation on an enlarged scale showing the spacing magnets, and associated mechanism.

Fig. 14 is a diagrammatic representation of the electromechanical features of our device and their controlling electric circuits.

Referring now to Figs. 1 to 13 inclusive, we will first explain the construction and co-functionality of the mechanism after which we will refer to Fig. 14 as well and explain the electrical features of the device and the operation of the device as a whole.

Figure 1:
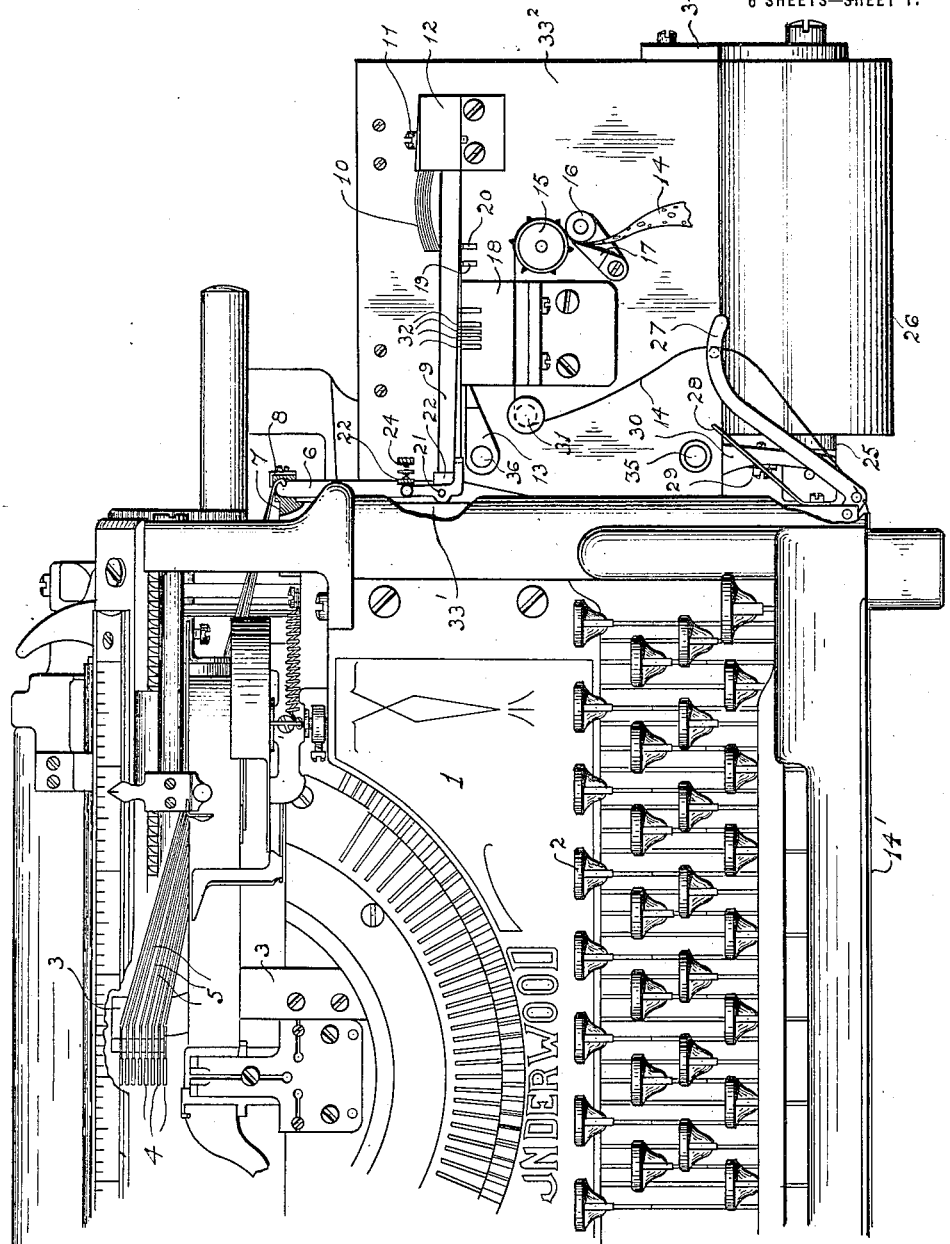
Figure 1 is a front elevation showing a portion of the operating typewriter.
Figure 7:
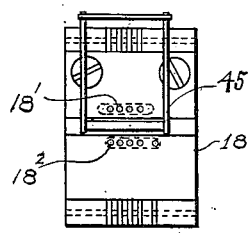
Fig. 7 is an enlarged plan view of the die, with punches removed.
Figure 8:
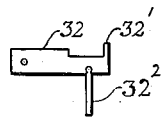
Fig. 8 is an enlarged view of one of the punches and its associated punch bar.
Figure 6:
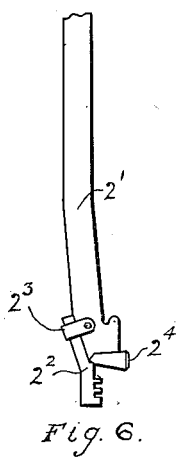
Fig. 6 is an enlarged view of one of the type bars with selector lug attached.
Figure 5:
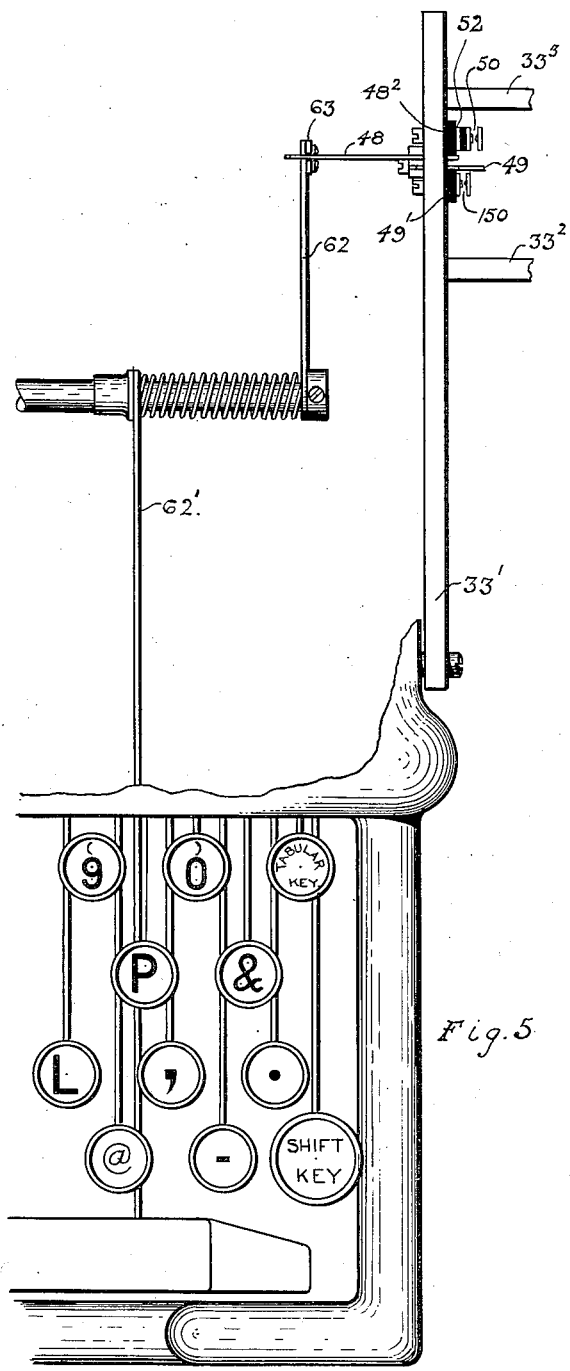
Fig. 5 is a detailed view of the spacing lever organization on an enlarged scale and with the typewriter broken away.

The typewriter 1 may be of any make as our perforating mechanism may be adapted to operate with various kinds of typewriters provided they are of the type using individual type bars. The perforating mechanism is mounted upon three metallic plates, $33^1$ which is secured to one end of the frame of the typewriter 1, $33^2$ which is rigidly secured with its surfaces of greatest area perpendicular to plate $33^1$, and plate $33^3$ which is similarly secured to $33^1$ and parallel to $33^2$, as shown in Figs. 2 and 5. The punch and die 18 is rigidly secured in an aperture in the plate $33^2$ and comprises, as shown in Figs. 7, 8 and 11 a die provided with two rows of holes $18^1$ and $18^2$, five in one row and four in another, each hole being provided with a punch $32^2$ linked to a punch bar 32 which is in turn pivoted in a slot in the frame of the die 18. Each punch bar 32 is provided with a ward $32^1$, and each ward is staggered with relation to wards preceding and following to permit of the selective operation of the punches by the punch bar operating levers 9, of which there is one for each of the punches, and one extra, making ten in all. The function of the tenth lever will be hereinafter pointed out. The levers 9 are pivoted in a support 12, which is rigidly secured to the plate $33^2$, and each lever is provided with a leaf spring 10, the springs being securely held in the support 12 by means of the cap plate 11. The free extremities of the levers 9 are normally held against the tension of the springs 10 in shoulders as $6^2$ provided on the latching levers 6, of which there is one for each of the nine punch bar operating levers, and a short one $6^1$ for the extra or tenth punch bar operating lever. These latching levers are pivoted at one exteremity in a slotted block $21^2$, which is securely attached to the plate $33^1$ in an aperture cut therein to permit of the operation of the latching levers. The extra or tenth punch bar operating lever is adapted to be released from its latching lever $6^1$ when any of the latching levers 6 are operated, and for this purpose the latching lever $6^1$ is rigidly attached to a bar 76 which passes back of all of the latching levers and is maintained in place by a pivoted lever 77. The stirrup thus formed is held against the latching levers by means of the flat spring 79 in order that when any of the latching levers 6 are operated the bar 77 will be moved against the tension of the spring 79 to cause lever $6^1$ to release its associated punch bar operating levers to strike the bell crank 21 and close the electric contacts 22 and 24 for a purpose that will hereinafter be described. The latching levers 6 are operated to release their associated punch bar operating levers 9 by means of the releasing bars 5, of which there is one for each of the latching levers. As shown in Fig 1, these releasing bars 5 engage a notch in the extremities of the latching levers and their point of engagement is maintained in a slotted guide 7 provided with a cover 8. The other extremities of the releasing bars 5 are linked to bell cranks as 4 Fig. 3, which are pivoted in slots in a supporting member 3, which is in turn secured to the typewriter, as shown in Fig. 1 in such manner as to bring all of the bell cranks 4 with their free extremities substantially in line with the vertical center line of any type when the same is in a position of actual printing. Each type bar of the typewriter as $2^1$ is provided, as shown in Figs. 2 and 6, with a lug $2^2$ which is attached near the type $2^4$ by a strap $2^3$ and is cut with wards which strike only such of the bell cranks 4 as are necessary to release the proper punch bar operating levers to permit the proper grouping of perforations to, in any predetermined system of telegraphy, transmit the character corresponding to the type on the type bar.

We have now described all of the mechanism used in selecting and perforating, and it will be noted that the selection and grouping of perforations is accomplished substantially simultaneously with the act of perforating as the type bar operating levers 9 are always in a condition of potential operation and the acts of selection and release are therefore practically instantaneous with the act of perforation. It will be further noted that while we disclose a die provided with nine holes that more or less may be provided and that a great variety of grouping of perforations may be made suitable to almost any system of rapid telegraphy by simply altering the location of the wards on the selector lugs $2^2$.

The mechanism for restoring the perforating organization to normal after its operation comprises an electro-magnet of the solenoid type 26 rigidly secured to the plates $33^2$ and $33^3$ by means of the plate 34 which is secured to both of the plates, and further acts to insure their rigidity. The plunger 25 of the solenoid 26 is provided with a pin 25¹ which engages the forked extremity of a bell crank 30 carried on a shaft 35 and linked by a link 59 with a crank 41 which is rigidly secured to the shaft 36, the extremity of which after emerging through the plate 33² bears rigidly secured a lug 13 which is adapted when the solenoid 26 is energized to lift the punch bar operating levers 9 to a position which allows them to latch on the shoulders 6² of the latching levers 6. A punch restoring stirrup 45, Figs. 7 and 11, normally resting with its restoring bar in a recess in the die 18 is provided with two arms which are pivoted in slots in the frame of the die 18 and extend beyond the die on the inner side of the plate 33², as shown in Fig. 9. A lever 43 is pivoted by a pivot screw 42 and provided with a set screw 44 which engages a bar connecting the two inner extremities of the arms of the restoring stirrup 45. The lever 43 is adapted to be engaged at its extremity by an extension of the link 59 in order that when the solenoid 26 is energized to restore the punch bar operating levers 9 the lever 43 will be operated to depress the inner portion of the restoring stirrup 45 to cause the bar of the stirrup to engage the free extremities of the punch bars 32 to withdraw the punches which they carry from the die 18. A spring 38 is attached at one extremity to the crank 41 and at the other extremity to the plate 33² and serves to return the plunger 25 of the solenoid 26 and its associated restoring mechanism to normal after operation. A set screw 29 is provided in the lever 30 and serves as a means for adjusting the length of stroke of the solenoid.

The tape feeding mechanism comprises an electric motor 90 rigidly attached to the frame of the typewriter 1 at the rear and connected through coupling 91, shaft 89¹, friction clutch 89 and shaft 88¹ with a worm 88 which meshes with a wheel 87 carried on a shaft 87¹. The shaft 87¹ carries a relatively small pinion 86 which meshes with a spur gear cut on a shoulder of a spring housing 85. A flat clock spring is carried within the housing 85, one extremity of which is attached to the housing and the other extremity of which is attached to a shaft 75, which extends through apertures in plates 33³ and 33², and is provided at its extremity with a sprocket wheel 15. This sprocket wheel is rigidly secured to the shaft 75 and is provided with six teeth which are equally spaced with regard to the periphery of the sprocket wheel. A tape 14 is provided with a row of centrally located equally spaced perforations which are adapted to be engaged by the teeth of the sprocket wheel to draw the tape 14 through the die 18. A tape reel is provided on the opposite end of the typewriter (not shown in the figures) and the tape 14 passes in a tunnel 14¹ underneath the typewriter from left to right, as viewed in Fig. 1, where it is engaged by a stirrup 27 which is held by a light spring 28 against the tape 14 when the tape is being fed to assist in drawing the tape from the feed roll and to maintain an even tension on the tape at the sprocket wheel 15. A roller 31 serves to guide the tape as it enters the die 18, while a roller 16 serves to hold the tape into engagement with the sprocket wheel 15, and a stripper 17 acts to direct the tape away from the sprocket wheel.

The tape feed releasing and spacing mechanism comprises four electromagnets of the solenoid type 70, 71, 72 and 73, Figs. 2 and 13, which are grouped about the shaft 75 and rigidly secured to the inner surface of plate 33³. The solenoids are provided with plungers 70¹, 71¹, 72¹ and 73¹ respectively, and each plunger is adapted to operate a pawl as 70², 71², 72² and 73² respectively. The pawls are all normally held, by springs as shown, with their detent extremities in contact with the surface of the three tooth ratchet wheel 76 which is rigidly secured to the shaft 75. Thus by operating the electromagnets the shaft 75 is allowed to rotate under tension of the clock spring contained in the housing 85, and may be stopped in any one of its twelve possible stop positions as will be further described. The shaft 75 carries at its extremity a commutator 90, Fig. 4, comprising three insulated conductor rings 91, 92 and 93 and three groups of three insulated commutator segments as 80¹. An insulated brush holder 82 encircles the commutator 90 and carries four brushes as 82¹, 82², 82³ and 82⁴ which are spaced equally from each other and bear upon the commutator segments as 80¹. The brush holder 82 is rigidly secured to a support 81, which is in turn supported by a plate 92 rigidly secured to the plate 33¹. The brush holder support 81 serves to support an insulated brush holder which carries brushes 81¹, 81² and 81³ which bear respectively on the commutator rings 91, 92 and 93 of commutator 90. A pair of electric contacts 50, 52, and 150, 152 are supported opposite an aperture in the plate 33¹. Contacts 50, 52 are operated by means of a bell crank shaped lever 48 pivoted in a block 51 secured to plate 33¹ and provided with an insulated lug 48² and a lug 48¹. This lever is adapted to be operated by the spacing bar of the typewriter 1, as shown in Fig. 5, and for this purpose there is added to the spacing bar mechanism 62¹ of the typewriter a horizontally disposed lever 62 linked with a vertically disposed lever 63, the upper extremity of which engages a notch in the lever 48 to allow the lever 48 to be operated through the agency of the spacing bar of the typewriter to operate the electric contacts 50, 52. A lever 130

49 is likewise pivoted in block 51 and is provided with an insulated lug $49^1$ to engage the electric contacts 150, 152, and the lug $48^1$ on the lever 48 is adapted to engage the lever 49 in order that when ever the lever 48 is operated by the spacing bar of the typewriter the lever 49 will likewise be operated to operate its associated electric contacts. Further, the lever 49 is provided with an extension which engages a crank attached to the shaft 35 in order that the operation of the solenoid 26 in restoring the punch bar operating levers 9 will cause the lever 49 to operate its associated electric contacts 150, 152. The mechanism for selecting a double or triple space comprises a pair of bell cranks 19 and 20 carried in a support $20^1$ which is secured in an aperture in the plate $33^2$. The bell crank 19 operates electric contact 47 while the bell crank 20 operates electric contact 46. The horizontal portions of the bell cranks extend under the punch bar operating levers 9 and are provided with properly located wards that they may be selectively operated by the proper punch bar operating levers when the same are used in the perforation of groups requiring extra spacing, as will hereinafter be described.

Referring now to Fig. 14, which illustrates diagrammatically the electrical features and circuits of our improved device, 76 is the ratchet wheel greatly enlarged, 82 is the brush holder and 80 the commutator with the commutator rings 91, 92 and 93 disposed concentrically within the outline of the commutator to assist the explanation. The sprocket wheel 15 is shown attached to the shaft 75, and the brushes are shown at $82^1$, $82^2$, $82^3$ and $82^4$. One group of the commutator segments are indicated at $80^1$, $80^2$, $80^3$. These segments are each in width equal to $\frac{1}{24}$ of the circumference of the commutator, and the segments of each group are separated by a width of insulation likewise equal to $\frac{1}{24}$ of the circumference of the commutator. The groups of commutator segments are spaced equidistant from each other and are separated by a distance equal to three times the width of any commutator segment. Correspondingly located segments of the commutator are each connected to the same commutator ring, as for instance commutator segment $80^1$ is connected to ring 91 and the correspondingly positioned commutator segments are likewise connected to ring 91. Segment $80^2$ is connected to ring 92 and segment $80^3$ to ring 93. Brushes $81^1$, $81^2$, $81^3$ bear upon rings 91, 92 and 93 respectively and the brushes are so located with respect to the commutator and the commutator is so located with respect to the teeth of the ratchet wheel 76 that three of the brushes in any of the stop positions of the commutator always bear upon and make contact with one segment of each of the three groups of commutator segments, while the fourth brush bears on the median point of the insulation between two groups of commutator segments. It will be noted that the commutator, ratchet wheel and sprocket wheel 15 are all rigidly attached to the shaft 75 and revolve therewith. Therefore, the tape 14 will be moved a lineal distance equal to $\frac{1}{12}$ of the circumference of the sprocket wheel 15 when any pawl as $73^2$ is lifted to allow the ratchet wheel to rotate clockwise as indicated by the arrow in Fig. 14 because the rotation of the ratchet wheel will be terminated by the engagement of a tooth of the ratchet wheel with the nearest pawl, which in this case is $70^2$, and the extremity of this pawl is $\frac{1}{12}$ of the circumference of the ratchet wheel away from the nearest tooth thereon. Should this pawl be held away from engagement with the ratchet wheel through the energization of its magnet 70 the rotation of the ratchet wheel will be stopped by pawl $71^2$ after the ratchet wheel has rotated a distance equal to $\frac{2}{12}$ of its circumference for the extremity of this pawl is at the initiation of rotation of the sprocket wheel, in this case, a distance away from the nearest tooth on the sprocket wheel equal to $\frac{2}{12}$ of the circumference of the sprocket wheel, and should this detent pawl likewise be held away from engagement with the ratchet wheel through the energization of its controlling electromagnet 71 the rotation of the ratchet wheel will not be stopped until pawl $72^2$ engages the tooth which was initially engaged by pawl $73^2$ after the ratchet wheel has rotated a distance equal to $\frac{3}{12}$ of its circumference. Thus it is obvious, that by energizing the electromagnets 70, 71, 72 and 73 in proper sequence, the tape 14 may be caused to move selected lineal distances, equal to $\frac{1}{12}$, $\frac{2}{12}$ or $\frac{3}{12}$ of the circumference of the sprocket wheel, to accomplish variant spacings of the groups of perforations in the tape. In building up letters into words and sentences it is necessary to have the three tape spacing intervals at all times available for selection in any order and that is the purpose of the commutator and its associated electric circuits in our device. After each group of perforations is made and spaced the three available space intervals are again placed in a condition for selection in any order. The relation, therefore, of the brushes $82^1$, $82^2$, etc., the commutator segments and the ratchet wheel is such that the brush connected to the magnet controlling the pawl at any time restraining the ratchet wheel from rotation is always in electric contact through, ring 91 of commutator 90 and brush $81^1$ with contact 150; the pawl next nearest a tooth, in the direction of rotation of the ratchet wheel, is $\frac{1}{12}$ of the circumference of the ratchet wheel away therefrom and the pawl next ahead is $\frac{1}{12}$ of the circumference of the ratchet wheel away, while the last pawl is always, from the tooth which it may engage, $\frac{3}{12}$ of the circumference of the ratchet wheel removed therefrom. The releasing solenoids 70, 71, 72 and 73 are in the diagram represented as electromagnets, with the detent pawls $70^2$, $71^2$, $72^2$ and $73^2$ represented as simple armatures with retaining springs. Corresponding terminals of the electromagnets are all connected through conductors 116 and 108 with the negative side of a source of direct current, while the remaining terminals of each of the electromagnets are connected to their associated brushes as magnet 70 to brush $82^1$, magnet 71 to brush $82^2$, etc. The solenoid for restoring the perforating mechanism is shown at 26 with its plunger 25 and crank 30. One terminal of this restoring solenoid is connected through conductor 108 with the negative side of the source of current supply while the other terminal is connected through conductors 107 and 111 with one member of contact 22 of the electrical switch operated by the bell crank 21. The member common to both contacts 22 and 24 of this switch is connected through conductor 110 with the positive side of the current supply while the remaining member of contact 24 is connected through resistance 100 with one member of the switch 46, which is operated by the space selector bell crank 20, and through conductor 113 with brush $81^3$. This same member of contact 24 is likewise connected through resistance 101 with one member of switch 47 which is operated by space selector bell crank 19, and through conductor 114 with brush $81^2$. The remaining member of switch 46 is connected through conductors 109 and 108 with the negative side of the current supply source while the remaining member of switch 47 is connected to one member of contact 52 of the switch operated by lever 48, the other member of which contact is connected through conductors 109 and 108 with the negative side of the source of current supply. One member of contact 50 of the other switch operated by lever 48 is connected through resistance 102 and conductor 110 with the positive side of the current supply source while the remaining member of this same contact is connected to conductor 112. One member of contact 150 of the switch operated by lever 49 is connected through conductor 115 with brush $81^1$ while the remaining member of this same contact is connected through condenser 104 and conductors 116 and 110 with the positive side of the source of current supply. This contact member of this switch is common to both contacts 150 and 152. The remaining member of contact 152 is connected to resistance 103, which is connected to bridge condenser 104.

A condenser 105 is bridged across contact 22 to take up the spark when the supply of current to solenoid 26 is broken.

The operation of the device is as follows:

Considering first the operation of the device when a group of perforations is made that require only a single space to correctly space the character printed thereby with regard to subsequently printed characters, then when a key as 2, Fig. 1, is depressed the selector lug $2^1$ carried by the type bar operated by that key is caused by directly applied energy to impinge upon certain selected bell cranks 4 to operate their associated release bars 5 to cause certain latching levers to release their associated punch bar operating levers which in turn are caused through the release of the stored mechanical energy of the springs 10 to drive their associated punches through the tape to perforate the particular group of perforations needed to transmit the character on the type bar used. The operation of the latching levers 6 causes, as hereinbefore explained, the latching lever $6^1$ to release the extra or tenth punch bar operating lever which operates the bell crank 21 to, first, close contact 24, Figs. 1, 2 and 14, which allows current to flow from the positive side of the direct current supply source through conductor 110, conductor 112, resistances 100 and 101, (the contacts 46 and 47 are closed, as the character requires only a single spaced group of perforations), contacts 46, 47 and 52, conductor 109, conductor 108 and thence to the negative side of the source of supply. Then as the tenth punch bar operating lever reaches the full extent of its travel, the bell crank 21 is finally operated to close contact 22 which allows current to flow from the positive side of the source of supply through conductor 110, contact 22, conductor 111, conductor 107, solenoid 26 and thence through conductor 108 to the negative side of the source of supply and solenoid 26 is thus energized to, as hitherto explained, withdraw the punches from the tape. As soon as this is fully accomplished but before the punch bar operating levers are restored to their latching position, lever 49, Fig. 10, is operated to open contact 152 and to close contact 150 which connects the empty condenser 104, (normally short circuited by resistance 103) through conductor 110 and 116 with the positive side of the source of supply and through conductor 115, brush $81^1$, conductor ring 91, the segment of commutator upon which brush $82^4$ rests, brush $82^4$, magnet 73, conductor 116 and conductor 108, with the negative side of the source of supply and magnet 73 is thereby momentarily energized by the passage of the quantity of current necessary to fill condenser 104 to withdraw pawl $73^2$ from its engagement with a tooth on the ratchet wheel 76 to allow the ratchet wheel to rotate under tension of the released stored energy of the spring in the housing 85, Fig. 4, to, as hitherto explained, move the tape one space or until the ratchet wheel is stopped by engagement with pawl 70², thus the perforations just made are spaced with pawl 73² immediately falls back into engagement with the surface of the ratchet wheel. The solenoid 26 in the meantime continues its stroke and finally restores the used punch bar operating levers and the extra or tenth punch bar operating lever and thus contacts 22 and 24 are opened, solenoid 26 is thereby deënergized and lever 49 is returned to normal by spring 38 allowing contact 150 to be broken and contact 152 to be made to short circuit and thus discharge condenser 104.

In the case of a group of perforations which are rather more extensive and require that the tape be moved two spaces before a subsequent group of perforations are made, the operation of the device is similar to that just described except that in this case one of the punch bar operating levers used in the particular group of perforations impinges on a ward on bell crank 19, Figs. 1, 2, 10 and 11, to open contact 47, and thus when contact 24 is made by bell crank 21, current flows from the positive side of the supply source through conductor 110, contact 24, conductor 112, resistance 101, conductor 114, brush 81², ring 92, commutator segment 80², brush 82¹, magnet 70, conductor 116, and through conductor 108 to the negative side of the source of supply, to cause pawl 70² to be held out of engagement with ratchet wheel 76 when pawl 73² is subsequently released, as hereinbefore explained, to allow the ratchet wheel to rotate $\frac{2}{12}$ of its circumference or until it is stopped by pawl 71² to space the group of perforations two spaces. Further, if a group of perforations is selected that are so extensive as to require the tape to be moved after their perforation a distance of three spaces, then one of the punch bar operating levers used in that particular group of perforations strikes on a ward of bell crank 20 while another one of the punch bar operating levers impinges on a ward on bell crank 19 and both contacts 46 and 47 are held open at the time contact 24 is made, and obviously current is supplied to both magnets 70 and 71 to hold both pawls 70² and 71² out of engagement with the ratchet wheel to allow the ratchet wheel when released to rotate $\frac{3}{12}$ of its circumference to move the perforations just made three spaces.

It is obviously necessary sometimes that the tape must be spaced or moved without being perforated, to separate sentences, etc. For this purpose the lever 48 is adapted to be operated by the spacing lever 62¹, Fig. 5, of the typewriter to open first contact 52 and close contact 50. Contact 50 is the electrical counterpart of contact 24 and allows current to flow from the positive side of the source of supply through conductor 110, resistance 102, contact 50, conductor 112, resistance 101, contact 47 and contact 52 and conductor 109 to the negative side of the source of supply. When contact 52 has been opened through the operation of the spacing lever of the typewriter, current flows, instead of back to the negative side of the source of supply through conductor 109, through conductor 114, brush 81², commutator ring 92, commutator segment 80², brush 82¹, and magnet 70, and conductor 108 back to the negative side of the source of supply to enliven the magnet 70 to withhold pawl 70² from engagement with the ratchet wheel so that when the ratchet wheel is subsequently released through the operation of lever 49 which in this case is operated by lug 48¹ on lever 48 to open contact 152 and close contact 150 to allow current to energize magnet 73 to withdraw pawl 73² and allow the ratchet wheel to rotate $\frac{2}{12}$ of its circumference or until it is stopped by pawl 71². This accomplishes the spacing of the tape when no perforations are made therein.

It will be observed from the foregoing that many of the operations begin before previous operations terminate and it is through this overlapping of the time intervals, that the total time interval required for the full functioning of the device is rendered a minimum. Further the use of stored mechanical energy which is released to perform work achieves high speed operation as such motive force accelerates at a maximum.

While we have illustrated and described our invention as adapted to a particular grouping of perforations it is to be thoroughly understood that we may vary the system of grouping, the spacing and other details of our device in many ways without departing from the spirit or narrowing the scope of our invention.

Having thus described our invention what we claim as new and desire to secure by United States Letters Patent is as follows:

1. A perforator comprising, a plurality of punches and dies, stored energy for automatically operating said punches and dies to perforate selected perforations in a sheet of paper, to move said sheet after perforation a distance determined by the perforations just made, means to restore said punches and dies to normal and means for automatically replenishing said stored energy.

2. In a perforator, a perforating member, means for moving a tape in steps of variant lengths, a first source of mechanical energy, means for utilizing said energy to operate said perforating member to perforate said tape, means for restoring said perforating member after its operation, and a second source of mechanical energy for energizing said tape moving means.

3. In a perforator, a plurality of type bars, a plurality of perforating members, a first source of mechanical energy, members attached to the type bearing extremities of said type bars for releasing energy from said source to selectively operate one or more of said perforating members to perforate a tape, means for restoring said perforating members to normal, and a second source of mechanical energy for moving said tape with relation to said perforating members.

4. In a perforator, a plurality of type bars, a plurality of perforating members, a first source of mechanical energy, members attached to said type bars for releasing energy from said source to selectively operate one or more of said perforating members to perforate a tape, means for restoring said perforating members after their operation, and a second source of mechanical energy for moving said tape with relation to said perforating members in steps of selected variant lengths.

5. In a perforator, a plurality of type bars, a plurality of perforating members, a first source of mechanical energy, members attached to the type bearing extremities of said type bars for releasing energy from said source to selectively operate one or more of said perforating members to perforate a tape, means for restoring said perforating members after their operation, and a second source of mechanical energy for moving said tape with relation to said perforating members.

6. A perforator comprising, a plurality of perforating members adjacent to a tape, spring actuated operating members for each of said perforating members, latching members for each of said operating members, means for selectively operating said latching members to selectively release said operating members, restoring means for said perforating and said operating members, and means for moving said tape.

7. A perforator comprising, a plurality of punches and dies adjacent to a tape, spring actuated operating members for each of said punches, latching members for each of said operating members, means for selectively operating said latching members to selectively release said operating members, restoring means for said punches and said operating members, and means for moving said tape with relation to said punches and dies in selected steps of variant lengths.

8. In a perforator, a plurality of perforating members, means for feeding a tape past said perforating members, a spring, means for utilizing the energy of said spring to selectively operate one or more of said perforating members to perforate said tape, means for restoring said perforating members after their operation, and a source of mechanical energy for energizing said tape feeding means.

9. In a perforator, a plurality of perforating members, means for feeding a tape past said perforating members, a spring, means for utilizing the energy of said spring to selectively operate one or more of said perforating members to perforate said tape, means for restoring said perforating members after their operation, a source of mechanically stored energy for energizing said tape feeding means, and means for replenishing said source of mechanically stored energy.

10. In a perforator, a plurality of perforating members, means for feeding a tape in steps of variant lengths past said perforating members, a first source of mechanically stored energy, means for releasing energy from said source to selectively operate one or more of said perforating members to perforate said tape, electro-mechanical means for restoring said perforating members after their operation, and a second source of mechanically stored energy for energizing said tape feeding means.

11. In a perforator, a plurality of perforating members, means for feeding a tape in steps of variant lengths past said perforating members, a first source of mechanical energy, means for utilizing energy from said source to selectively operate one or more of said perforating members to perforate said tape, electro-mechanical means for restoring said perforating members after their operation, and a second source of mechanical energy for energizing said tape feeding means.

12. In a perforator, a plurality of punches and dies, a first source of mechanical energy, means utilizing directly applied energy for releasing energy from said first source to selectively operate one or more of said punches, means for feeding variant lengths of a tape through said punch and die, electro-magnetic means for restoring said punches after operation, and a second source of mechanical energy for energizing said tape feeding means.

13. In a perforator, a plurality of punches and dies, a first source of mechanically stored energy, means utilizing directly applied energy for releasing energy from said first source to selectively operate one or more of said punches, means for feeding variant lengths of a tape through said punch and die, electro-magnetic means for restoring said punches after operation, and a second source of mechanically stored energy for energizing said tape feeding means.

14. In a perforator, a plurality of perforating members, means adapted to move a strip of paper with relation to said perforating members in steps of variant lengths, a first source of mechanical energy, means for releasing energy from said first source to operate said perforating members selectively to perforate said strip of paper and to select the length of step which said strip of paper is to be moved, electro-magnetic means for restoring said perforating members after their operation, electro-magnetic means for limiting, in accordance with the previous selection, the length of step which said strip of paper is to be moved, and a second source of mechanical energy for energizing said strip moving means.

15. In a perforator, a plurality of perforating members, means adapted to move a strip of paper with relation to said perforating members in steps of variant lengths, a first source of mechanically stored energy, means for releasing energy from said first source to operate said perforating members selectively to perforate said strip of paper and to select the length of step which said strip of paper is to be moved, electro-magnetic means for restoring said perforating members after their operation, electro-magnetic means for limiting, in accordance with the previous selection, the length of step which said strip of paper is to be moved, a second source of mechanically stored energy for energizing said strip moving means, and a source of electrical energy for releasing energy from said second source.

Signed by us at Toronto, county of York and Province of Ontario, in the presence of two witnesses.

CHARLES G. ASHLEY
ERNEST T. BYSHE.

Witnesses:
L. NEWSOME,
A. SINCLAIR.